(12) United States Patent
Bell, II

(10) Patent No.: US 9,361,354 B1
(45) Date of Patent: Jun. 7, 2016

(54) HIERARCHY OF SERVICE AREAS

(75) Inventor: John Philip Bell, II, Skibbereen (IE)

(73) Assignee: EMC CORPORATION, Hopkinton, MA (US)

(*) Notice: Subject to any disclaimer, the term of this patent is extended or adjusted under 35 U.S.C. 154(b) by 59 days.

(21) Appl. No.: 11/772,179

(22) Filed: Jun. 30, 2007

Related U.S. Application Data

(60) Provisional application No. 60/826,072, filed on Sep. 18, 2006, provisional application No. 60/826,073, filed on Sep. 18, 2006, provisional application No. 60/826,053, filed on Sep. 18, 2006, provisional application No. 60/826,074, filed on Sep. 18, 2006, provisional application No. 60/826,042, filed on Sep. 18, 2006.

(51) Int. Cl.
*G06F 17/30* (2006.01)
*H04L 29/08* (2006.01)
*H04L 12/24* (2006.01)

(52) U.S. Cl.
CPC .... *G06F 17/30598* (2013.01); *G06F 17/30115* (2013.01); *H04L 41/12* (2013.01); *H04L 41/5003* (2013.01); *H04L 41/5009* (2013.01); *H04L 67/16* (2013.01); *G06F 17/30899* (2013.01); *Y10S 707/99931* (2013.01); *Y10S 707/99942* (2013.01)

(58) Field of Classification Search
CPC . H04L 41/12; H04L 41/5003; H04L 41/5009; H04L 67/16; G06F 17/30115; G06F 17/30598; G06F 17/30899; Y10S 707/99931; Y10S 707/99942
USPC .................... 709/223, 226; 707/694, 999.001
See application file for complete search history.

(56) References Cited

U.S. PATENT DOCUMENTS

| 6,003,040 | A | 12/1999 | Mital et al. |
| 6,167,445 | A | 12/2000 | Gai et al. |
| 6,308,216 | B1 | 10/2001 | Goldszmidt et al. |

(Continued)

FOREIGN PATENT DOCUMENTS

| EP | 1855218 A2 | 11/2007 |
| WO | WO 2008/036621 | 3/2008 |

OTHER PUBLICATIONS

U.S. Appl. No. 11/528,772, Sep. 12, 2008, Pre-Interview First Office Action.

(Continued)

*Primary Examiner* — Viet Vu
*Assistant Examiner* — Herman Belcher
(74) *Attorney, Agent, or Firm* — Workman Nydegger

(57) ABSTRACT

Systems and methods of classifying structured and/or unstructured data. Hierarchical categorization is used when evaluating and providing data services. For instance, service level objectives may contain sub-levels associated with additional service level objectives. This hierarchal system enables an entity to create a more efficient structure for managing and mapping service level objectives to the various services offered by a data center or by service providers associated with a network. Higher service level objectives are groupings of sub service level objectives. Decisions for each data object can be made independently and the hierarchical arrangement enables conflicting service levels to be resolved. An entity can adequately categorize its data, thereby allowing the entity to better maintain and service the data according to its needs using an information management system.

18 Claims, 5 Drawing Sheets

(56) References Cited

U.S. PATENT DOCUMENTS

| | | |
|---|---|---|
| 6,349,297 B1 | 2/2002 | Shaw et al. |
| 6,363,053 B1 | 3/2002 | Schuster et al. |
| 6,430,613 B1 | 8/2002 | Brunet et al. |
| 6,591,300 B1 | 7/2003 | Yurkovic |
| 6,633,312 B1 | 10/2003 | Rochford et al. |
| 6,865,728 B1 | 3/2005 | Branson et al. |
| 7,028,312 B1 | 4/2006 | Merrick et al. |
| 7,185,073 B1 | 2/2007 | Gai et al. |
| 7,240,076 B2 | 7/2007 | McCauley et al. |
| 7,278,156 B2 | 10/2007 | Mei et al. |
| 7,363,292 B2 * | 4/2008 | Chaboche ............... 707/3 |
| 7,412,518 B1 | 8/2008 | Duigou et al. |
| 7,433,304 B1 | 10/2008 | Galloway et al. |
| 7,543,020 B2 | 6/2009 | Walker et al. |
| 7,548,915 B2 | 6/2009 | Ramer et al. |
| 7,565,324 B2 | 7/2009 | Vincent |
| 7,580,357 B2 | 8/2009 | Chang et al. |
| 7,613,806 B2 | 11/2009 | Wright et al. |
| 7,616,642 B2 | 11/2009 | Anke et al. |
| 7,676,798 B2 | 3/2010 | Snover et al. |
| 7,725,570 B1 | 5/2010 | Lewis |
| 7,725,571 B1 | 5/2010 | Lewis |
| 7,730,172 B1 | 6/2010 | Lewis |
| 7,734,765 B2 | 6/2010 | Musman et al. |
| 7,739,239 B1 * | 6/2010 | Cormie et al. .......... 707/626 |
| 7,895,220 B2 | 2/2011 | Evans et al. |
| 7,953,740 B1 | 5/2011 | Vadon et al. |
| 8,069,435 B1 | 11/2011 | Lai |
| 8,104,080 B2 | 1/2012 | Burns et al. |
| 8,548,964 B1 | 10/2013 | Nair et al. |
| 8,620,724 B2 | 12/2013 | Adhiraju et al. |
| 2002/0016800 A1 | 2/2002 | Spivak et al. |
| 2002/0091746 A1 | 7/2002 | Umberger et al. |
| 2002/0120685 A1 | 8/2002 | Srivastava et al. |
| 2002/0161883 A1 | 10/2002 | Matheny et al. |
| 2003/0023587 A1 | 1/2003 | Dennis et al. |
| 2003/0023712 A1 | 1/2003 | Zhao et al. |
| 2003/0036886 A1 | 2/2003 | Stone |
| 2003/0041050 A1 | 2/2003 | Smith et al. |
| 2003/0093528 A1 * | 5/2003 | Rolia ................... 709/226 |
| 2003/0140009 A1 | 7/2003 | Namba et al. |
| 2003/0167180 A1 * | 9/2003 | Chung et al. ............ 705/1 |
| 2003/0196108 A1 | 10/2003 | Kung |
| 2003/0212778 A1 * | 11/2003 | Collomb ............... 709/223 |
| 2003/0225829 A1 | 12/2003 | Pena et al. |
| 2003/0233391 A1 * | 12/2003 | Crawford et al. ........ 709/104 |
| 2003/0233464 A1 | 12/2003 | Walpole et al. |
| 2003/0236904 A1 | 12/2003 | Walpole et al. |
| 2004/0060002 A1 | 3/2004 | Lucovsky et al. |
| 2004/0098415 A1 | 5/2004 | Bone et al. |
| 2004/0133876 A1 | 7/2004 | Sproule |
| 2004/0215650 A1 | 10/2004 | Shaji et al. |
| 2004/0236660 A1 | 11/2004 | Thomas et al. |
| 2004/0243699 A1 | 12/2004 | Koclanes et al. |
| 2005/0060662 A1 | 3/2005 | Soares et al. |
| 2005/0071182 A1 * | 3/2005 | Aikens et al. .............. 705/1 |
| 2005/0102297 A1 | 5/2005 | Lloyd et al. |
| 2005/0125768 A1 * | 6/2005 | Wong et al. ............ 717/100 |
| 2005/0131982 A1 | 6/2005 | Yamasaki et al. |
| 2005/0132034 A1 | 6/2005 | Iglesia et al. |
| 2005/0177545 A1 | 8/2005 | Buco et al. |
| 2005/0197852 A1 * | 9/2005 | Gebhard et al. .......... 705/1 |
| 2005/0235342 A1 | 10/2005 | Ene-Pietrosanu et al. |
| 2005/0251533 A1 | 11/2005 | Harken et al. |
| 2005/0262097 A1 | 11/2005 | Sim-Tang et al. |
| 2005/0273451 A1 | 12/2005 | Clark et al. |
| 2005/0289216 A1 * | 12/2005 | Myka et al. ........... 709/201 |
| 2006/0015388 A1 | 1/2006 | Flockhart et al. |
| 2006/0036463 A1 | 2/2006 | Patrick et al. |
| 2006/0039364 A1 | 2/2006 | Wright |
| 2006/0092861 A1 | 5/2006 | Corday et al. |
| 2006/0095543 A1 | 5/2006 | Ito et al. |
| 2006/0095570 A1 | 5/2006 | O'Sullivan |
| 2006/0101084 A1 | 5/2006 | Kishi et al. |
| 2006/0106782 A1 | 5/2006 | Blumenau et al. |
| 2006/0112108 A1 | 5/2006 | Eklund et al. |
| 2006/0114832 A1 | 6/2006 | Hamilton et al. |
| 2006/0129415 A1 | 6/2006 | Thukral et al. |
| 2006/0129974 A1 | 6/2006 | Brendle et al. |
| 2006/0179143 A1 | 8/2006 | Walker et al. |
| 2006/0236061 A1 * | 10/2006 | Koclanes ................ 711/170 |
| 2006/0248165 A1 | 11/2006 | Sridhar et al. |
| 2006/0248187 A1 | 11/2006 | Thorpe et al. |
| 2007/0038683 A1 | 2/2007 | Dixon et al. |
| 2007/0055689 A1 | 3/2007 | Rhoads et al. |
| 2007/0058632 A1 | 3/2007 | Back et al. |
| 2007/0061363 A1 | 3/2007 | Ramer et al. |
| 2007/0070894 A1 | 3/2007 | Wang et al. |
| 2007/0083875 A1 | 4/2007 | Jennings |
| 2007/0094392 A1 | 4/2007 | Stone et al. |
| 2007/0103962 A1 | 5/2007 | Kavuri et al. |
| 2007/0104208 A1 | 5/2007 | Svensson |
| 2007/0127370 A1 | 6/2007 | Chang et al. |
| 2007/0153802 A1 | 7/2007 | Anke et al. |
| 2007/0162749 A1 | 7/2007 | Lim |
| 2007/0192352 A1 | 8/2007 | Levy |
| 2007/0208751 A1 | 9/2007 | Cowan et al. |
| 2007/0214208 A1 | 9/2007 | Balachandran |
| 2007/0226228 A1 * | 9/2007 | Her et al. ................ 707/10 |
| 2007/0260640 A1 | 11/2007 | Hamilton et al. |
| 2007/0294406 A1 | 12/2007 | Suer et al. |
| 2007/0299828 A1 | 12/2007 | Lewis et al. |
| 2008/0002678 A1 | 1/2008 | Klessig et al. |
| 2008/0005086 A1 | 1/2008 | Moore |
| 2008/0021850 A1 | 1/2008 | Irle et al. |
| 2008/0049642 A1 | 2/2008 | Gudipudi et al. |
| 2008/0059387 A1 | 3/2008 | Vaidhyanathan et al. |
| 2008/0071726 A1 | 3/2008 | Nair et al. |
| 2008/0071727 A1 | 3/2008 | Nair et al. |
| 2008/0071813 A1 | 3/2008 | Nair et al. |
| 2008/0071908 A1 | 3/2008 | Nair et al. |
| 2008/0077682 A1 | 3/2008 | Nair et al. |
| 2008/0077995 A1 | 3/2008 | Curnyn et al. |
| 2008/0097923 A1 | 4/2008 | Kim et al. |
| 2008/0114725 A1 | 5/2008 | Indeck et al. |
| 2008/0134043 A1 | 6/2008 | Georgis et al. |
| 2008/0177994 A1 | 7/2008 | Mayer |
| 2008/0243900 A1 | 10/2008 | Yohanan et al. |
| 2008/0301760 A1 | 12/2008 | Lim |
| 2009/0064185 A1 | 3/2009 | Araujo |
| 2009/0077210 A1 | 3/2009 | Musman et al. |
| 2009/0150431 A1 | 6/2009 | Schmidt et al. |
| 2009/0157881 A1 | 6/2009 | Kavuri et al. |
| 2010/0250497 A1 | 9/2010 | Redlich et al. |
| 2013/0110810 A1 | 5/2013 | Nair et al. |

OTHER PUBLICATIONS

U.S. Appl. No. 11/528,783, Nov. 7, 2008, Pre-Interview First Office Action.
U.S. Appl. No. 11/528,898, Sep. 5, 2008, Pre-Interview First Office Action.
U.S. Appl. No. 11/692,051, filed Mar. 27, 2007, Perrin et al.
U.S. Appl. No. 11/692,058, filed Mar. 27, 2007, Perrin et al.
U.S. Appl. No. 11/694,753, filed Mar. 30, 2007, Nair et al.
U.S. Appl. No. 11/694,764, filed Mar. 30, 2007, Nair et al.
U.S. Appl. No. 11/694,783, filed Mar. 30, 2007, Perrin et al.
U.S. Appl. No. 11/772,192, filed Jun. 30, 2007, Nair et al.
U.S. Appl. No. 11/528,900, Jun. 9, 2008, Office Action.
U.S. Appl. No. 11/528,783, Feb. 24, 2009, Office Action.
U.S. Appl. No. 11/528,898, Feb. 9, 2009, First Action Interview.
U.S. Appl. No. 11/528,898, Apr. 3, 2009, Office Action.
U.S. Appl. No. 11/528,900, Jan. 23, 2009, Final Office Action.
U.S. Appl. No. 11/694,753, Mar. 25, 2009, Office Action.
U.S. Appl. No. 11/694,783, Feb. 6, 2009, Office Action.
U.S. Appl. No. 11/528,772, Jun. 3, 2009, Final Office Action.
U.S. Appl. No. 11/528,783, Jun. 25, 2009, Final Office Action.
U.S. Appl. No. 11/528,900, Aug. 25, 2009, Notice of Allowance.
U.S. Appl. No. 11/692,058, Jul. 9, 2009, Office Action.
U.S. Appl. No. 11/692,051, Aug. 26, 2009, Office Action.
U.S. Appl. No. 11/528,898, Oct. 7, 2009, Final Office Action.
U.S. Appl. No. 11/694,753, Nov. 18, 2009, Final Office Action.

(56) References Cited

OTHER PUBLICATIONS

U.S. Appl. No. 11/528,772, Mar. 3, 2011, Office Action.
U.S. Appl. No. 11/528,790, Jan. 13, 2011, Final Office Action.
U.S. Appl. No. 11/692,058, Jan. 24, 2011, Notice of Allowance.
U.S. Appl. No. 11/694,753, Jan. 19, 2011, Office Action.
U.S. Appl. No. 11/694,764, Mar. 17, 2011, Office Action.
U.S. Appl. No. 11/864,596, Mar. 11, 2011, Office Action.
U.S. Appl. No. 11/864,605, Mar. 9, 2011, Final Office Action.
U.S. Appl. No. 11/864,760, Jan. 27, 2011, Final Office Action.
U.S. Appl. No. 11/864,764, Jan. 27, 2011, Office Action.
U.S. Appl. No. 11/694,753, Oct. 5, 2010, Final Office Action.
U.S. Appl. No. 11/772,192, Oct. 29, 2010, Final Office Action.
U.S. Appl. No. 11/864,605, Nov. 4, 2010, Office Action.
U.S. Appl. No. 11/864,770, Nov. 3, 2010, Office Action.
U.S. Appl. No. 11/694,753, Jun. 17, 2011, Final Office Action.
U.S. Appl. No. 11/864,770, Apr. 19, 2011, Final Office Action.
U.S. Appl. No. 11/864,774, May 11, 2011, Office Action.
U.S. Appl. No. 11/528,772, Aug. 10, 2010, Final Office Action.
U.S. Appl. No. 11/528,783, Sep. 1, 2010, Final Office Action.
U.S. Appl. No. 11/528,790, Jul. 12, 2010, Office Action.
U.S. Appl. No. 11/692,058, Jul. 6, 2010, Office Action.
U.S. Appl. No. 11/694,764, Aug. 4, 2010, Final Office Action.
U.S. Appl. No. 11/864,596, May 26, 2010, Final Office Action.
U.S. Appl. No. 11/864,605, May 28, 2010, Final Office Action.
U.S. Appl. No. 11/864,760, Jul. 27, 2010, Office Action.
U.S. Appl. No. 11/528,772, Oct. 27, 2011, Notice of Allowance.
U.S. Appl. No. 11/528,790, Jan. 23, 2012, Office Action.
U.S. Appl. No. 11/694,753, Jan. 26, 2012, Office Action.
U.S. Appl. No. 11/694,764, Sep. 26, 2011, Final Office Action.
U.S. Appl. No. 11/772,192, Jan. 5, 2012, Office Action.
U.S. Appl. No. 11/864,596, Oct. 7, 2011, Final Office Action.
U.S. Appl. No. 11/864,764, Aug. 29, 2011, Final Office Action.
U.S. Appl. No. 11/864,774, Dec. 9, 2011, Final Office Action.
U.S. Appl. No. 11/864,596, Sep. 28, 2007, Nair et al.
U.S. Appl. No. 11/864,605, Sep. 28, 2007, Nair et al.
U.S. Appl. No. 11/864,760, Sep. 28, 2007, Nair et al.
U.S. Appl. No. 11/864,764, Sep. 28, 2007, Nair et al.
U.S. Appl. No. 11/864,770, Sep. 28, 2007, Nair et al.
U.S. Appl. No. 11/864,774, Sep. 28, 2007, Nair et al.
U.S. Appl. No. 11/528,772, Jan. 28, 2010, Office Action.
U.S. Appl. No. 11/528,783, Jan. 15, 2010, Office Action.
U.S. Appl. No. 11/692,058, Jan. 8, 2010, Final Office Action.
U.S. Appl. No. 11/864,596, Nov. 12, 2009, Office Action.
U.S. Appl. No. 11/694,753, Mar. 29, 2010, Office Action.
U.S. Appl. No. 11/692,051, Feb. 19, 2010, Notice of Allowance.
U.S. Appl. No. 11/692,051, Mar. 31, 2010, Notice of Allowance.
U.S. Appl. No. 11/694,764, Jan. 28, 2010, Office Action.
U.S. Appl. No. 11/864,770, Nov. 27, 2009, Office Action.
U.S. Appl. No. 11/864,770, Apr. 21, 2010, Final Office Action.
U.S. Appl. No. 11/772,192, Apr. 15, 2010, Office Action.
U.S. Appl. No. 11/864,760, Nov. 24, 2009, Office Action.
U.S. Appl. No. 11/864,760, Apr. 7, 2010, Final Office Action.
U.S. Appl. No. 11/864,605, Jan. 14, 2010, Office Action.
U.S. Appl. No. 11/528,783, Aug. 15, 2012, Final Office Action.
U.S. Appl. No. 11/528,790, Jul. 18, 2012, Final Office Action.
U.S. Appl. No. 11/694,753, Nov. 30, 2012, Notice of Allowance.
U.S. Appl. No. 11/694,764, Aug. 1, 2012, Final Office Action.
U.S. Appl. No. 11/772,192, Jun. 12, 2012, Final Office Action.
U.S. Appl. No. 11/864,605, Jul. 3, 2012, Office Action.
U.S. Appl. No. 11/528,783, Feb. 14, 2012, Office Action.
U.S. Appl. No. 11/528,898, Mar. 1, 2012, Office Action.
U.S. Appl. No. 11/864,764, May 3, 2012, Office Action.
U.S. Appl. No. 13/414,512, filed Mar. 7, 2012, Nair et al.
U.S. Appl. No. 11/528,898, Oct. 2, 2012, Final Office Action.
U.S. Appl. No. 11/694,753, Aug. 31, 2012, Notice of Allowance.
U.S. Appl. No. 11/694,764, Nov. 29, 2012, Final Office Action.
U.S. Appl. No. 11/864,605, Nov. 8, 2012, Final Office Action.
U.S. Appl. No. 11/864,770, Feb. 4, 2012, Office Action.
U.S. Appl. No. 11/864,764, Dec. 10, 2012, Final Office Action.
Ben-Ghorbel-Talbi et al.; "An Extended Role-Based Access Control Model for Delegating Obligations"; Springer-Verlag Berline Heidelberg 2009.
Belokosztolszki et al.; "Meta-Policies for Distributed Role-Based Access Control Systems"; 2002 IEEE.
U.S. Appl. No. 11/528,790, Jun. 17, 2013, Office Action.
U.S. Appl. No. 11/694,764, May 21, 2013, Notice of Allowance.
U.S. Appl. No. 11/864,605, May 24, 2013, Notice of Allowance.
U.S. Appl. No. 11/864,770, Jun. 13, 2012, Final Office Action.
U.S. Appl. No. 11/864,774, Apr. 15, 2013, Notice of Allowance.
U.S. Appl. No. 13/414,512, Aug. 1, 2013, Office Action.
U.S. Appl. No. 11/528,790, Jan. 10, 2014, Final Office Action.
U.S. Appl. No. 11/772,192, Aug. 12, 2013, Notice of Allowance.
U.S. Appl. No. 11/864,770, Nov. 26, 2013, Office Action.
U.S. Appl. No. 11/864,764, Nov. 20, 2013, Office Action.
U.S. Appl. No. 13/972,089, filed Aug. 21, 2013, Nair et al.
Gasser et al., "An Architecture for Practical Delegation in a Distributed System", 1990 IEEE Computer Society Symposium, May 7-9, 1990, pp. 20-30.
U.S. Appl. No. 11/528,790, May 8, 2014, Notice of Allowance.
U.S. Appl. No. 11/528,898, Sep. 24, 2014, Office Action.
U.S. Appl. No. 11/864,596, Jun. 16, 2014, Notice of Allowance.
U.S. Appl. No. 11/864,770, May 16, 2014, Final Office Action.
U.S. Appl. No. 13/414,512, Sep. 30, 2014, Notice of Allowance.
U.S. Appl. No. 13/972,089, Apr. 16, 2014, Notice of Allowance.
U.S. Appl. No. 11/528,783, Feb. 4, 2012, Office Action.
U.S. Appl. No. 11/864,760, Jan. 28, 2012, Decision on Appeal.
U.S. Appl. No. 11/864,770, Dec. 5, 2012, Office Action.
U.S. Appl. No. 11/864,764, Jun. 25, 2012, Final Office Action.
U.S. Appl. No. 11/864,764, Jan. 16, 2012, Office Action.
U.S. Appl. No. 13/414,512, Mar. 14, 2014, Final Office Action.
U.S. Appl. No. 13/719,084, Jul. 26, 2013, Office Action.
U.S. Appl. No. 13/719,084, Jan. 6, 2013, Notice of Allowance.

\* cited by examiner

HIERARCHY OF SERVICE AREAS

CROSS-REFERENCE TO RELATED APPLICATIONS

This application claims the benefit of:

U.S. Provisional Application Ser. No. 60/826,072, filed Sep. 18, 2006 and entitled "INFORMATION MANAGEMENT";

U.S. Provisional Application Ser. No. 60/826,073, filed Sep. 18, 2006 and entitled "CASCADED DISCOVERY OF INFORMATION ENVIRONMENT";

U.S. Provisional Application Ser. No. 60/826,053, filed Sep. 18, 2006, entitled "ENVIRONMENT CLASSIFICATION";

U.S. Provisional Application Ser. No. 60/826,074, filed Sep. 18, 2006 and entitled "INFORMATION CLASSIFICATION"; and U.S. Provisional Application No. 60/826,042, filed Sep. 18, 2006, entitled "SERVICE LEVEL MAPPING METHOD";

which applications are incorporated herein by reference in their entirety.

BACKGROUND OF THE INVENTION

1. The Field of the Invention

The present invention relates to information management. More particularly, embodiments of the invention relate to systems and methods of classifying structured and/or unstructured data for use in assigning service areas and service level objectives to objects in a computer system.

2. The Relevant Technology

The world is slowly and continually moving from being paper-based to being electronic-based. This evolution is apparent in almost every aspect of life, from the workplace, to government institutions, to homes. In each area, paper-based methods of communication and storage are being replaced by electronic information. Businesses have replaced bulky paper files and expensive storage rooms with electronic files and searchable databases. Tax-payers are encouraged to submit returns electronically rather than in paper form, and email is rapidly becoming a principal form of communication.

There are several reasons for this transition, one of which is the convenience and accessibility of electronic systems. Email, for example, often arrives shortly after sending it, and information submitted electronically can be quickly formatted, processed, and stored without the inconvenience of manually reviewing each submission by hand.

As entities become more dependent on electronic data, the ability to manage electronic data becomes crucial for a variety of different reasons. For example, much of the electronic data maintained by an entity or organization often relates to different aspects of the entity and is often subject to various considerations. Without an effective way to manage the electronic data, it is difficult to apply the appropriate considerations to the data.

Further, an entity often has substantial unstructured data whose value is not readily known. Further the services needed to manage the unstructured data are similarly unknown. For example, an entity may have a file storage system that is regularly backed up, despite the presence of files on the system that have little or no value to the entity. Similarly, an entity may have files of substantial value that are not receiving adequate services. Without an effective way to sort, classify, and maintain the data, the entity is not receiving the proper services.

Generally, there are a number of factors used to determine how data is handled and which services are needed to properly maintain the data. Some of the factors or considerations commonly used include data security, data backup, data retention, data access control, regulatory compliance, corporate compliance, and the like or any combination thereof. Because most data systems are unstructured and inadequately classified with respect to these services, it is difficult to ensure that the appropriate services are being applied.

Conventional data service systems are typically one-dimensional when defining the areas of service that may be performed on a data object. These systems fail to account for the realities of current business entities by creating a series of one-dimensional rules to apply to data objects. This methodology restricts such entities from effectively managing and safeguarding their data.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
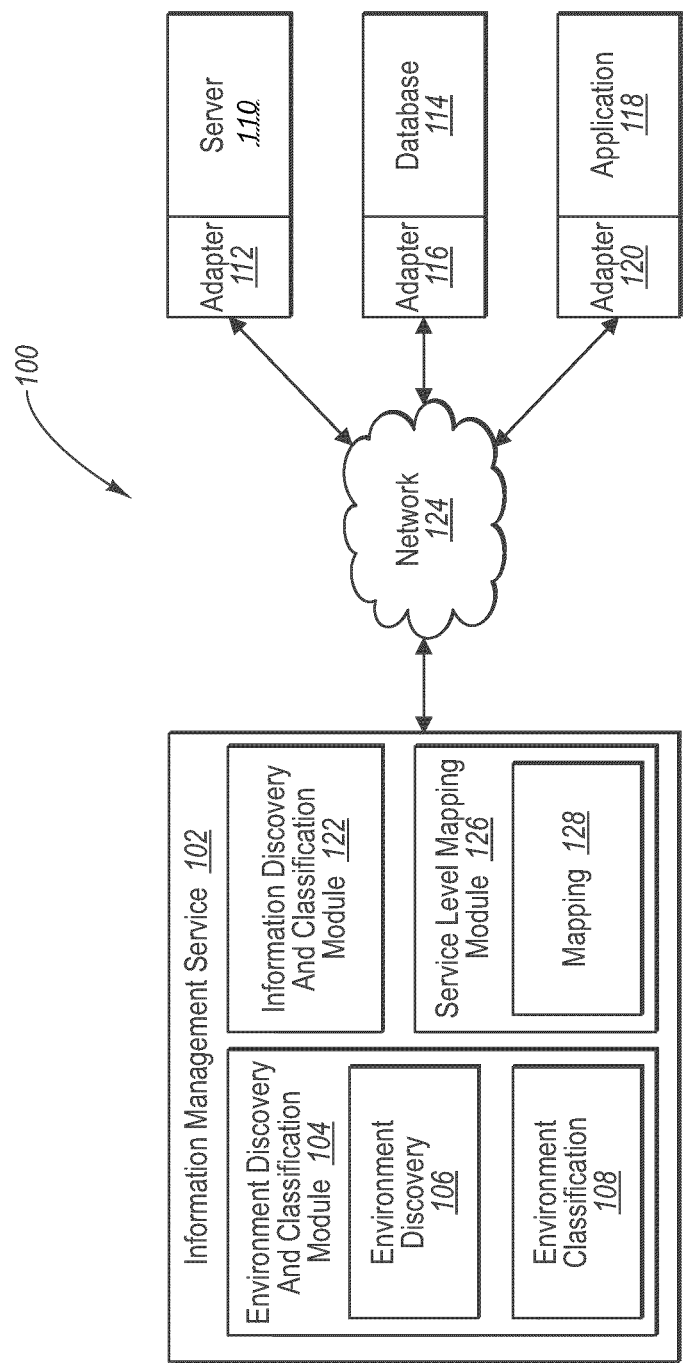
FIG. 1 illustrates a computer system having an information management service configured for classifying the environment components of the computer system, in accordance with the present invention.

In the following detailed description of embodiments of the invention, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Embodiments of the present invention relate to methods and systems for hierarchically assigning service level objectives to data objects stored within a computer system. The computer system includes an information management service for providing customized services to data objects residing within the computer system. Alternatively, the computer system may subscribe to the information management service remotely. The data center, which includes one or more service providers, can be used to provide the identifies services.

As used herein, the terms "data", "object", and "data object" may include, but are not limited to, files, directories (e.g., volumes, file systems, and the like), user data, system data, applications, services, operating systems, instructions, and the like, that can be stored on one or more storage devices.

Backing up or recovering data may include backing up or recovering any of the data herein defined or understood by those of skill in the art. Data may be organized in logical directories that do not necessarily correspond to a particular storage device. The term "directory" can be used interchangeably with the term "volume" or "file system" to refer to any means of logically organizing data on a computer.

Certain embodiments described herein will involve electronic communication between a client computer system (herein referred to as a "client") requesting access to a network service at a server computer system (herein referred to as a "server"). Accordingly, the client sends a request to the server for particular access to its system resources, wherein if the client is authorized and validated, the server responds with a response message providing the desired information. Of course, other messaging patterns between client and server are available and are well known in the art.

It should be appreciated that the present invention can be implemented in numerous ways, including as a process, an apparatus, a system, a device, a method, or a computer-readable medium such as a computer-readable storage medium or a computer network wherein program instructions are sent over optical or electronic communication links.

1. Introduction to Information Management Services

Embodiments of the invention relate to information or data management. Information management may orchestrate or provide services such as data protection, security, data placement, corporate compliance, and others based on the needs of the underlying data and the value of the data to its owner. Embodiments of the invention enable the data to be classified in an automated fashion and provide various levels of granularity that can be adjusted as needed. Using the techniques described herein, an entity can be assured that its data is receiving the services that are actually required, although the owner is not actually required to provide those services. Embodiments of the invention, for example, can generate reports that identify recommended services. The following introduction provides context for the present invention, which focuses on a service level hierarchy used for facilitating the management and orchestration of customized service levels.

Information management is scalable and can be implemented in a variety of different computer or computing systems. A computer system, by way of example, may refer to a single computer, to multiple computers (including clients and/or server computers, and other devices) that are connected with a network or to a network. The objects of a computer system can include servers, applications, services, data, files, and the like or any combination thereof. A data center refers to the service providers that provide services. For instance, a backup server, a file indexer, data storage, etc., are examples of service providers that may be included by reference to a data center.

Referring to FIG. 1, a computer system 100 is illustrated operating in an environment that includes various environment components, including a server 110, a database 114, and an application 118. The computer system 100 may include, by way of example, a single computer, a local area network (LAN), metropolitan area network (MAN), a wide area network (WAN), and the like or combinations thereof. The components 110, 114, and 118 and the information management service 102 may be located locally or at a remote location in relation to the clients utilizing the information management service 102.

An information management service 102 may include, but is not limited to, an information discovery and classification module 122, an environment discovery and classification module 104, a service mapping module 126, and the like. The information residing in the computer system 100 is discovered and classified by the information discovery and classification module 122. The components 110, 114 and 118 that exist within or are accessible to the computer system 100 are discovered and classified by the environment discovery and classification module 104. The service level mapping module 126 is then used for matching the discovered data objects to their service needs, and for matching their service needs to the appropriate service provider (i.e. environment component) that is capable of providing those needs. Each of the modules 104, 122 and 126 will be described in further detail below.

As described previously, the environment discovery and classification module 104 is provided for discovering and for classifying the environment components 110, 114, and 118 that exist within or are accessible to the computer system 100. Although only three environment components are illustrated in FIG. 1, more or less environment components may be present.

The environment components 110, 114, and 118 may provide a variety of services to the computer system 100 and to the data residing therein. For example, the server 110 may act as a storage server, retention server, data migration server, backup server, recovery server, data protection server, and the like or any combination thereof. The database 114, for example, may act as an exchange database, a payroll database, and the like or any combination thereof. The application 118 may include, for example, a data indexer, a data miner, a data transport, a security application, and the like or any combination thereof. These components are intended to represent multiple components. One of skill in the art can appreciate that a network system may have multiple servers, databases, applications, storage systems, and the like.

a. Environment Discovery and Classification

Environment components 110, 114, or 118 are often limited as to the service areas and service levels that they are capable of providing. For example, the server 110 may be capable of providing a low level of security services for certain data files that do not require a high level of security, but the server 110 may be incapable of providing high level security services to highly confidential files. Therefore, it may be advantageous to classify the environment components in accordance with the service areas and service levels that each environment component is capable of providing. Alternatively, the components also represent the various applications, services, and the like that may be present in a computer system. Information about these components can be used when determining service level objectives, service areas, and the like. For example, the manufacturer, firmware version, application version, and the like are examples of data that can be collected and classified and used by an information management service.

Classifying the environment of the computer system 100 may be performed by the environment discovery and classification module 104 as follows. First, the system environment is discovered, and second, the discovered environment components are classified in accordance with their service level capabilities or for other reasons. In general, the environment discovery module 106 may create a detailed diagram of each environment component 110, 114, 118 contained within the computer system 100, as well as the manner in which each environment component interfaces with the other environment components and subsystems within the computer system 100. In order to create a detailed diagram, the environment discovery module 104 may rely on adapters 112, 116, and 120 that are specifically configured to communicate with and gather information from specific environment components 110, 114, and 118, respectively.

In order to classify the environment components 110, 114 and 118, the environment classification module 108 first identifies the environment components compiled by the environment discovery module 106. The environment classification module 108 analyzes the system environment data 106 in order to identify the service level capabilities of the environment components 110, 114 and 118. As described previously, the service level capabilities include the service areas and service levels that each of the environment components 110, 114 and 118 is able to provide to the data objects and other environment components located within the computer system 100.

The environment classification module 108 can then classify the environment components based on their service level capabilities. For example, a first backup server may provide a particular class of information protection service, such as daily backups, and a second backup server may provide a different class of information protection service, such as continuous data protection (CDP). The environment classification module 108 can also identify a server as being a file server. Discovery of such a server can include a variety of factors such as, but not limited to, firmware version, manufacturer, and the like. Further, more than one adapter can be used during the discovery of the environment as well as during the discovery of the data objects. The information collected by one adapter can be used to select additional adapters.

In one embodiment, storage locations may be classified based on the service levels that can be provided to the data objects stored at each of the storage locations. In some instances, the services that can be provided to data objects are location-dependant. In other words, the services that are available in a computer system can often only be performed if a data object is located at a specific location. For example, a distributed computer system may include three primary storage locations. The distributed computer system may further include a data indexer that is only capable of indexing data that is located on two of the three primary storage locations. Therefore, when the three primary storage locations are categorized, the categorization will be performed in accordance with whether the data objects stored at the primary storage locations can be indexed by the data indexer, among other factors.

In another embodiment, storage locations are classified based on the data protection services that the storage location requires in order to provide sufficient protection to the data objects it contains. For example, a first storage location containing data of high importance may be classified such that a snapshot engine will perform a snapshot backup of the storage location once every hour, while a second storage location containing data of low importance may be classified such that the snapshot engine will only perform a snapshot backup once every week.

In another embodiment, environment components are classified based on the locations within the computer system that the service applications are capable of providing services to. Environment discovery and classification as well as information discovery and classification are not necessarily performed repeatedly. For example, one an environment component is discovered and classified, it does not need to be rediscovered and reclassified again unless, for example, its firmware changes or its hardware changes, etc.

b. Information Discovery and Classification

A large variety of data objects may be stored within the computer system 100 and the data objects may have a variety of service needs. The process of identifying these service needs often begins by discovering the data objects with the information discovery and classification module 122. The service level objectives of a data object may be characterized by set of a service areas and a set of service levels. Service areas include generalized areas of service that may be performed on a data object, including data protection (e.g., frequency of backup, redundancy of data, and the like), data retention, data security (e.g., encryption, access control, and the like), data migration, data indexing, and the like. Service levels define the extent at which a service area is provided to the data object. For example, a service area may include data backup. Data backup may include various service levels, including an hourly backup, a daily backup, a weekly backup, a monthly backup, and the like.

The services required by each of the data objects may be imposed by the system administrator, governmental standards and regulations, company guidelines, and the like or any combination thereof. A single data object typically requires multiple services from more than one service area. The combination of services requested by a single data object is referred to herein as a "target service package."

A large computer system, such as an enterprise network, may include a large variety of data objects having various unique properties. Consequently, an evaluation of the data objects within a computer system may also result in many different service level objectives. By way of example, certain data objects must be retained for one year, while other types of data objects must be retained indefinitely. Likewise, certain data objects must be indexed, while indexing is not necessary or may be overly expensive or may waste valuable resources when performed for other types of data objects. In addition, certain data objects must be saved to a backup location at least once per day, while other types of data objects only need to be saved to the backup location once every week. Within a company or enterprise network, documents created by one division within the company may require a higher or different level of service than documents created by another division within the company. Furthermore, documents containing predefined words, phrases, or data patterns may require higher or different levels of service than other types of documents. Other examples of differing service areas and differing service levels required by data within the system will also be evident to one of ordinary skill in the art with the benefit of the present disclosure.

In order to efficiently determine the service level objectives of each data object residing in the computer system 100, the data objects may be classified using the information discovery and classification module 122. In general, the information discovery and classification module 122 may perform an automated classification process, which may classify the data objects in accordance with a predefined set of rules. The data objects may be classified based on a number of factors, including the content contained within each data object, the organization, group or individual that created the data object, the metadata associated with each data object, and the like and any combination thereof. The metadata may be used to determine the date of last use of the data object, owner of the data object, date of creation, file size, file type, disposition date, content of the object, and the like.

2. Service Level Mapping

Once the system environment and the data objects residing in the system have been discovered and classified, the service level mapping module 126 can perform the tasks of selecting service level objectives for each data object and selecting service packages and service providers that are capable of providing the service level objectives.

Figure 2:
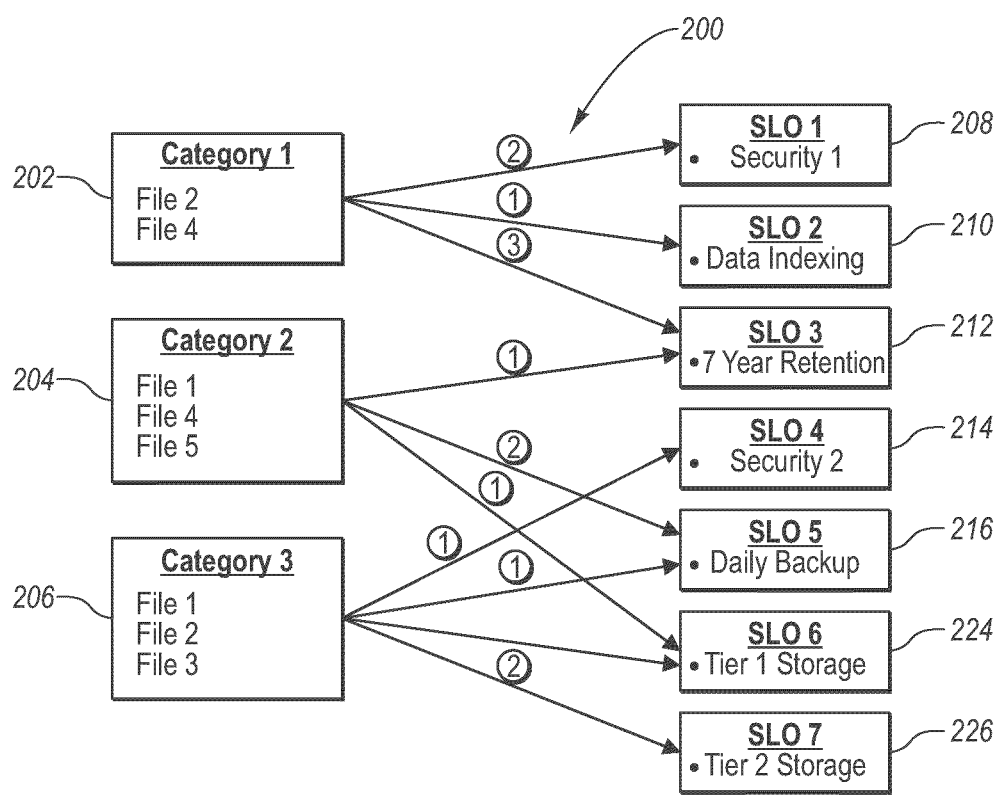
FIG. 2 illustrates a one-dimensional service level mapping of categories to service level objectives.

FIG. 2 provides an illustration of an exemplary one-dimensional service level mapping scheme 200 that may be employed by the service level mapping module 126 for matching each data object (i.e., Files 1-5) to the appropriate service level objectives (i.e., Service level objectives 1-7). As illustrated in FIG. 2, the files may be categorized into Categories 1-3 (202, 204 and 206), in accordance with properties associated with the files. By way of example, the first category 202 may include files that originated from a division within a company, such as accounting. The second category 204 may include files that exceed two gigabytes in size. The third category 206 may include files whose content includes private information, such as the social security numbers of customers of the company. The categorization of the files into the categories 202, 204 and 206 may be performed by the information discovery and classification module 122, as described previously.

A variety of different service level objectives may be offered to the files contained within the categories 202, 204 and 206. By way of example, the service level objectives that may be offered to the categories 202, 204 and 206 may include various security level objectives, including "Security 1" 208, where various control measures are applied to the data including access control and ownership control among others, data indexing 210, where the content of each file is indexed, seven year retention 212, where the data is stored for at least seven years prior to deletion, "Security 2" 214, where the data is subject to a different series of security measures including encryption services, daily backup 216, where the files are stored to a backup location on a daily basis, tier 1 storage 224, tier 2 storage 226, and the like. Many other service level objectives may be offered in addition to those illustrated in FIG. 2 and the invention is not so limited.

After assessing the categories 202, 204 and 206 and the available service level objectives 208, 210, 212, 214, 216, 224 and 226, the service level mapping module 126 maps each of the categories to one or more service level objectives for defining the types of services that will be requested by each category. The mappings are depicted by the arrows drawn from the categories 202, 204 and 206 to the service level objectives 208, 210, 212, 214, 216, 224 and 226. For example, Category 1 (202) is mapped to "Security 1" 208, data indexing 210 and seven year retention 212 service level objectives. Category 2 (204) is mapped to the seven year retention 212, daily backup 216 and tier 1 storage 224 service level objectives. Category 3 (206) is mapped to "Security 2" 214, daily backup 216 and tier 2 storage 226 service level objectives. The generated service level mappings between the categories 202, 204 and 206 and the service level objectives 208, 210, 212, 214, 216, 224 and 226 may be stored, for example, in the form of metadata, in the mapping data structure 128.

As illustrated in FIG. 2, a single file may be included in multiple categories. For example, 'File 1' is included both in Category 2 (204) and in Category 3 (206). Therefore, 'File 1' will receive the services requested by both Category 2 (204) and by Category 3 (206). Because conflicts may arise when a file is included in multiple categories, the mappings from the categories to the service level objectives may be prioritized in order to resolve any conflicts that may arise, as is described in further detail below.

One example service level conflict results in the service level mappings for the categories 204 and 206, which both contain 'File 2'. For example, the category 202 may include files originating in accounting, and the category 206 may include files whose content includes private information, such as the social security numbers of customers of the company, wherein 'File 2' falls within both of these categories. According to the service level mappings, files originating in accounting (i.e., Category 202) should receive services associated with the "Security 1" level, in accordance with service level 1 (208). However, files containing private information (i.e., Category 206) should receive "Security 2," which comprises a different assortment of security measures, including encryption. In order to resolve this conflict, the priority levels of each service level mapping are compared with one another. Because the priority level of the service level mapping requesting "Security 2" is a '1', the "Security 2" service is deemed to have a "higher" priority than the "Security 1" service. Therefore, the service level mapping module 126 selects that 'File 2' receive the service level objectives associated with "Security 2." (214).

In some circumstances, a file may not be included within any category 202, 204 or 206, or may include insufficient properties to categorize or to map the file to a service level. In these situations, it may be necessary to infer the proper service level for the uncategorized file based on other factors. In one embodiment, where a file contains insufficient properties to properly perform service level mapping, the service level mapping module 126 determines the mapping for the file based on its associations with other files. For example, the service level mapping module 126 may identify where the uncategorized file is located. Then, the service level mapping module 126 identifies the other files stored at the same location and the services that the other files are mapped to. The uncategorized file may then be assigned to the same service level objectives that are associated with the other files that are stored at the same location, based on the presumption that many files sharing a common location may also share common attributes and service level needs. This embodiment is only one exemplary technique for inferring service level objectives for uncategorized data objects. As will be appreciated by one of ordinary skill in the art, other techniques may also be employed for assigning service level objectives to uncategorized data objects with the benefit of the present disclosure.

Figure 3:
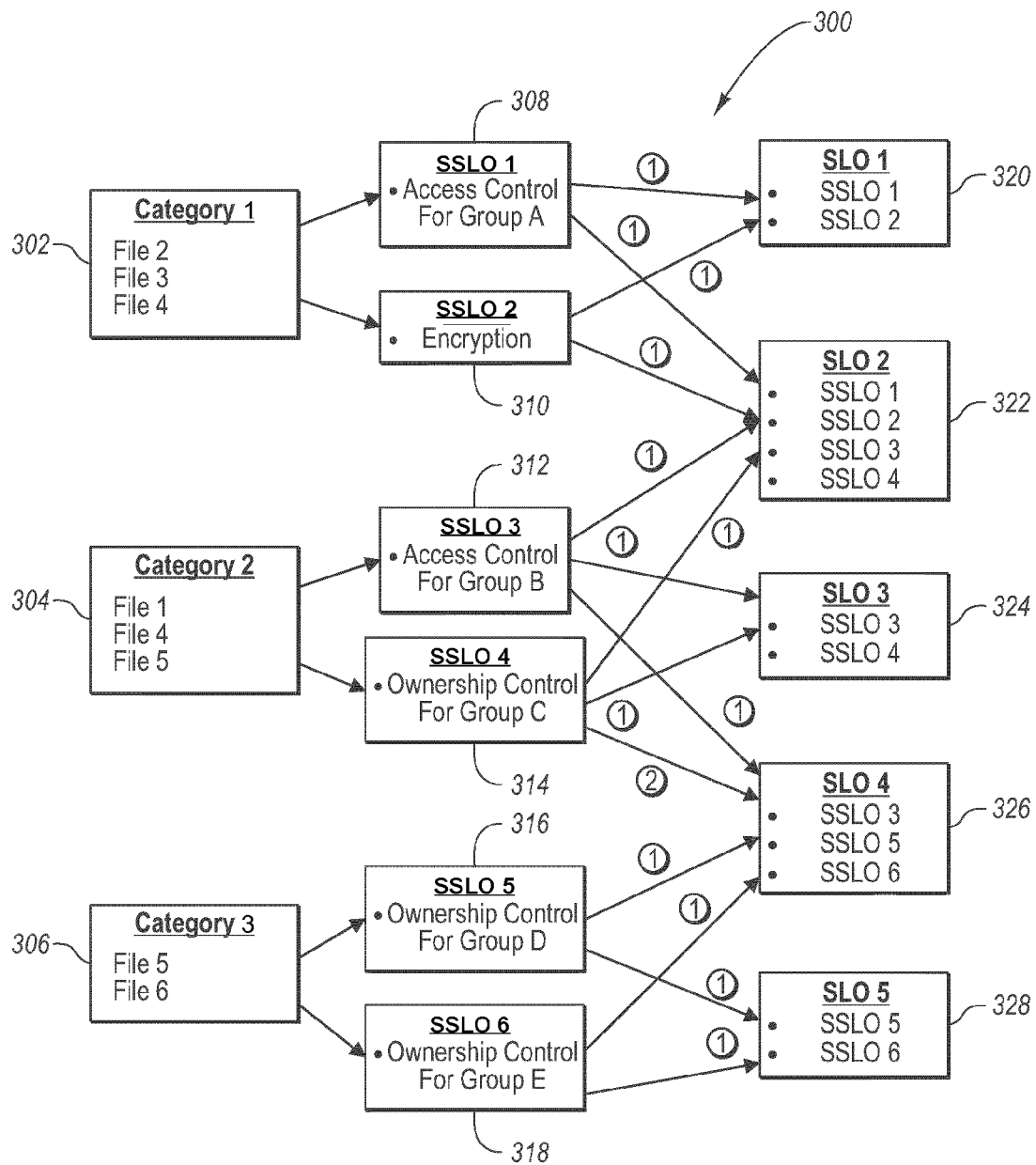
FIG. 3 illustrates a hierarchical service level mapping of categories to sub-service level objectives and larger service level objectives, in accordance with the present invention.

FIG. 3 provides an illustration of one embodiment of the use of a hierarchical service level mapping scheme 300 that may be employed by the service level mapping module 126 for matching a series of data objects (i.e. Files 1-6) to appropriate service level objectives (i.e. Service Level Objectives 1-5). As previously discussed, the files may be categorized into Categories 1-3 (320, 322, 324, 326, and 328). In addition, embodiments of the present invention utilize a hierarchical system of service level objectives, such that each category (302, 304, and 306) may be mapped to a sub-service level (308, 310, 312, 314, 316, and 318) based on properties of the data associated with each category. These sub-service level objectives 1-6 (308, 310, 312, 314, 316, and 318) may then be joined together according to a series of rules and priorities to form service level objectives 320, 322, 324, 326, and 328.

By way of example, the first category 302 may include files that are frequently accessed and may originate in a particular division within a company, such as the legal department. The second category 304 may be a series of files originating in an accounting department. The third category 306 may include financial records created by a corporate officer. As previously discussed, the categorization of the files into the categories may be performed by an information discovery and classification module 122.

A variety of different service level objectives may be offered to the files contained within the categories 302, 304, and 306. By way of example only, FIG. 3 illustrates several service level objectives commonly associated with data security service levels commonly offered by data centers. In this example, the service level objectives that may be offered to the categories 302, 304, and 306 may include encryption 310, audit control 318, access control 308 and 312, and ownership control 314 and 316. Many other service level objectives may be offered in addition to those illustrated in FIG. 3.

After assessing the categories 302, 304, and 306 and the available sub-service level objectives 308, 310, 312, 314, 316, and 318, the service level mapping module 126 maps each of the categories to one or more sub-service level objectives for defining the types of services that will be required by each category. The mappings are depicted by the arrows drawn from the categories 302, 304, and 306 to the sub-service level objectives 308, 310, 312, 314, 316, and 318. For example, Category 1 (302) is mapped to the access control service such that "Group A" has access to the files in category 1 (302). In addition, the files in Category 1 (302) are mapped to an encryption 310. Category 2 (304) is mapped to access control for "Group B" (312), and ownership control for "C" (314). Category 3 (306) is mapped to ownership control for "D" (316) and auditing control for "Group E" (318). As previously mentioned, the generated service level mappings between the categories 302, 304 and 306 and the sub-service level objectives 308, 310, 312, 314, 316, and 318 may be stored, for example, in the form of metadata, in the mapping data structure 128.

As illustrated in FIG. 3, a single file may be included in multiple categories. 'File 4' is included in both Category 1 (302) and in Category 2 (304). Therefore, 'File 4' will receive the services requested by both Category 1 (302) and Category 2 (304). Unlike the scenario presented in FIG. 2, according to the present invention, 'File 4' may receive each of these services.

One aspect of the present invention is the ability to create a hierarchy of aggregate service levels. Thus, in FIG. 3, the information management service 102 has the ability to create a service level objective 322 for 'File 4' comprised of data encryption 310, ownership control for "C" 314, and an access control service such that all members of "Group A" 308 and members of "Group B" 312 have access to the file. Advantageously, the ability to create aggregate service levels 320, 322, 324, 326, and 328, means that in scenarios where the service levels do not conflict (in areas such as access control, auditing control, and the like), the information management service 102 has the ability to apply each of the sub-service levels (such as 308, 310, 312, and 314) without requiring the client to create a master list of users with access or auditing control for a particular file.

Another advantage is the ability to create service level objectives that do not include a sub-service level associated with each service offered by the datacenter. For example, 'File 2' and 'File 3' are both included only in Category 1 (302) and have not requested any ownership control service levels. One aspect of the present invention permits the information management service 102 to create a service level objective 320 comprised of only those services requested by Category 1, namely encryption 310 and access control for "Group A" 308. Advantageously, this allows clients of the information management service 102 to request service levels for data without specifying parameters for each service offered. Thus, for example, in situations where there is no owner associated with a file or data object, the client need not specify an owner in order to request other security service levels for the data object.

Because conflicting categories may arise when a file is included in multiple categories that are associated with service levels that may not be aggregated, the mappings from the sub-service level objectives to the service level objectives may be prioritized in order to resolve any conflicts that may arise, as described in further detail below.

As previously discussed, the creation of the sub-service level mappings 300 may be done manually, by the client, or automatically through various programmed methods, or some combination thereof. For example, in one embodiment, a user manually creates the service level mappings 300 for each category 302, 304, and 306 via a user interface by selecting from the sub-service level objectives 308, 310, 312, 314, 316, and 318 provided by the system. In another exemplary embodiment, a user may establish a rule set for defining service level objectives that will be assigned to particular files and categories having one or more categories. When new files are discovered and classified, as previously described, the rule set is automatically applied to the files and/or categories in order to generate appropriate service level mappings.

In some situations, priorities may be assigned to various service level mappings between the sub-service level objectives 308, 310, 312, 314, 316, and 318 and the service level objectives 320, 322, 324, 326, and 328. The priorities may be used in order to resolve any conflicts that may arise between the various sub-service level objectives that may be requested by a single file. In FIG. 3, the priority levels are listed adjacent to the arrows representing the service level mappings from the sub-service level objectives 308, 310, 312, 314, 316, and 318 and the service level objectives 320, 322, 324, and 326.

One example of a conflict is illustrated with 'File 5' which is included in Category 2 (304) as well as Category 3 (306). Category 2 (304) is mapped to sub-service level objective 4 (314) requesting ownership control for "C," and Category 3 (306) is mapped to sub-service level objective 5 (316) requesting ownership control for "D." Since ownership control is a service level that generally can have only one user listed at a single time, one request must be given a higher priority than the other. In this example, either the user or the information management service 102 has created a rule requesting that requests for ownership control to "D" are a higher priority than requests for ownership control to "C." Thus, when the service level objective 4 (326) is created, it includes the request for the sub-service level objective of higher priority, sub-service level objective 5 (316) in this example.

Figure 4:
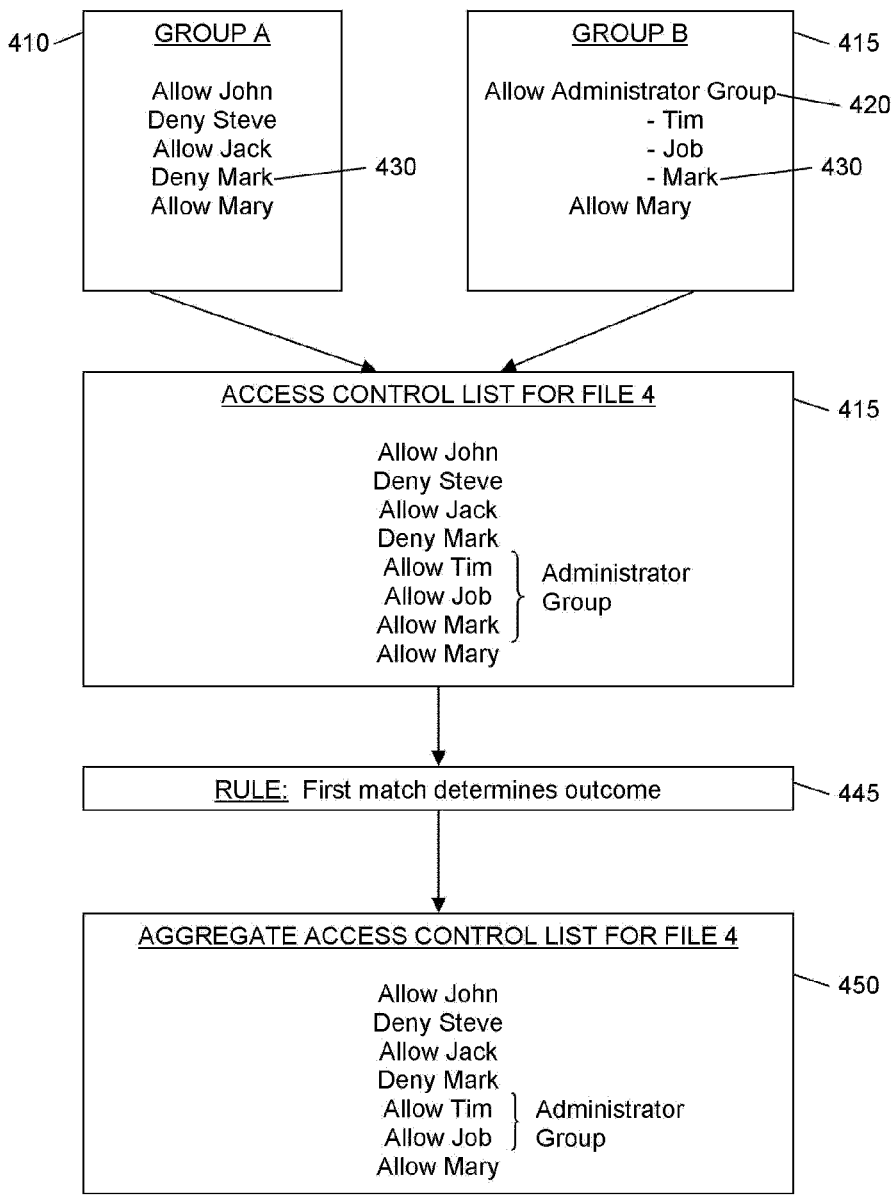
FIG. 4 illustrates the ability to resolve potential conflicts in the service level objectives in accordance with the present invention.

Together with FIG. 3, FIG. 4 illustrates another aspect of the invention, which allows the system to aggregate service levels in a service area, even at the same sub-service area. For example, Service Level 2 322 shown in FIG. 3 includes both the Sub-Service Level Objective 1 308 associated with access control for Group A and the Sub-Service Level Objective 3 312 for access control for Group B. As shown in FIG. 4, Group A has an access control list 410 of which grants access to John, Jack, and Mary, while denying access to Steve and Mark 430. Group B has an access control list 415 which grants access to the Administrator Group 420, which includes Tim, Job, and Mark 430.

Because File 4 is designated to receive both the access control service level objectives listed in the Sub-Service Level Objective 1 308 and the Sub-Service Level Objective 3 312, there is a need to aggregate the two Sub-Service Level Objectives 1 and 3 (308 and 312, respectively) into a single Aggregate Access Control List 450. According to one embodiment of the invention, a "File Access Control List" 440 is created which denies access to Steve and Mark 430, but subsequently grants access to all members of the Administrator Group 420, which includes Mark 430. In order to resolve the conflicting access designation regarding Mark 430, a rule 445 has been assigned to resolve any such conflicts which indicates that the first designation on the list has priority over subsequent designations. Thus, since Mark 430 is granted access via his membership in the Administrator Group 420, that access is given priority over his subsequent denial and he is given access to the File 4, as illustrated in the Aggregate Access Control List 450.

In this example, the rule 445 may be user-defined or defined by the demands of the computer system or, conversely, by an external data center. For example, the data center may have a mandatory or "without option" rule that evaluates all "deny access" designations before the "allow access" designations, meaning that in the example above, Mark's 430 denial would be evaluated first in the Aggregate Access Control List 450, and thus would be controlling.

In another embodiment, the system may discover and take into consideration such demands in order create Aggregate Access Control Lists 450 which satisfy both the user-defined or computer system defined rules together with the mandatory rules of the external data center. For example, if the external data center has a mandatory rule as described above, embodiments of the invention may create an Access Control List 450 which resolves any conflicts by granting access based on the first designation on the list and deleting all subsequent designations. Thus, one aspect of the invention is the ability to use the rules and requirements of the components of the system to create a hierarchy of aggregated service levels which take into consideration both the demands of the entity and the requirements of the data center.

In an exemplary information management service 102, following the service level mapping module 126, the service level objectives can then be bundled together into a target bundle that represents all the service level objectives that are desired for the data object. Next, service level mapping includes match the target bundle of service with service packages that are actually offered by service providers. Following this process, the various services are performed.

In effect, embodiments of the invention recognize that services are not necessarily one-dimensional concepts and that often some service area are multi-dimensional in the sense that several independent decisions are made to determine the service level needs of each data object. Hierarchical service level objectives as described herein enable these decisions to be made. For example, service level objectives are groupings of sub-service level objectives. Embodiments of this hierarchical arrangement enable the service decisions for each data object to be made independently.

Figure 5:
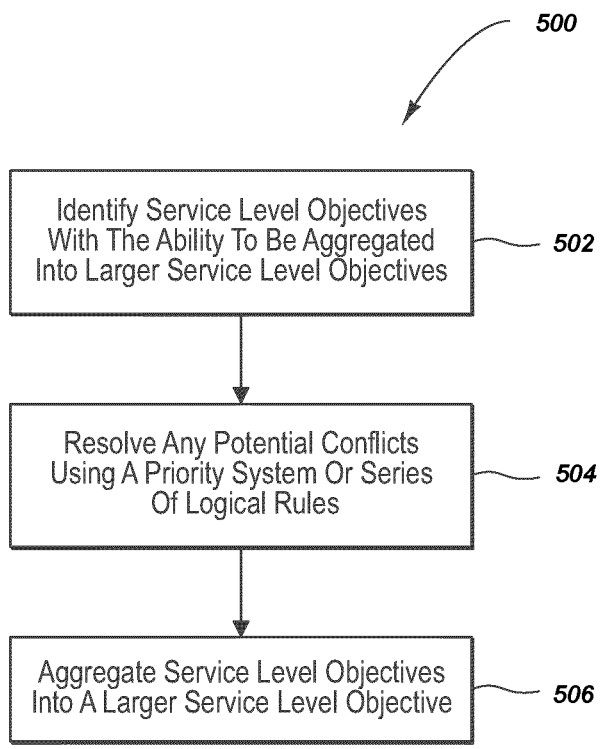
FIG. 5 illustrates a flow diagram of a method for aggregating sub-service level objectives into larger service level objectives according to the present invention.

FIG. 5 is a flow diagram representing the method of creating a hierarchy of service level objectives according to the present invention. The method 500 may be practiced, for example, in a computer system that includes and information management server capable of providing services to the data objects residing in the computer system.

The method 500 identifies 502 service level objectives (sub-service level objectives) that have the ability to be aggregated into larger service levels. The method 500 also identifies and resolves 504 any potential conflicts between the service level objectives using a priority system or series of logical rules. After resolving any conflicts, the method 500 then aggregates 506 service level objectives into larger service level objectives, which are generally comprised of at least two sub-service level objectives.

Embodiments herein may comprise a special purpose or general-purpose computer including various computer hardware. Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computer system that includes an information management server for providing customized services associated with service level objectives to files residing in the computer system, a method for mapping services to files hierarchically, the method comprising:
   the information management server categorizing each of the files to assign one or more categories to each of the files by applying a pre-defined first set of rules to each of the files, and based on metadata associated with each file and metadata generated from each file;
   the information management server generating service level mapping for each of the files to map each of the files to one or more service level objectives, wherein the service level mapping is multi-dimensional and hierarchical, wherein generating service level mapping includes:
   mapping each file to one or more sub-service level objectives based on the categories that have been assigned to each of the files, wherein each file is considered individually to map the files to the sub-service level objectives, wherein the sub-service level objectives identify services that are performed on the file individually;
   mapping the sub-service level objectives to service level objectives by applying a second set of rules to the sub-service level objectives to aggregate the sub-service level objectives into the service level objectives, wherein the service levels and the sub-service levels are hierarchically related, wherein each service level objective includes one or more sub-service level objectives, wherein each service level objective includes a different combination of the sub-service level objectives;
   the information management server resolving conflicts among file included in the sub-service level objectives, wherein conflicts occur when at least some of the sub-service level objectives cannot be aggregated into the service level objectives;

identifying a service package that is capable of providing at least one of the service level objectives associated with the file; and associating the identified service package with the file; and performing services in the service package on the files, based on the hierarchically related sub-service level objectives and service level objectives mapped to the files, and wherein at least one of the service level objectives is configured such that services included in the at least one service level objective can be provided without specifying parameters for each of the services included in the at least one service level objective.

2. The method according to claim 1, the method further comprising:

identifying a service package that is capable of providing at least one of the service level objectives associated with the file; and associating the identified service package with the file.

3. The method according to claim 1 further comprising providing a user, via a user interface, with a number of selectable service level objectives included in the sub-service level objectives, wherein the selectable service level objective are capable of being associated with other service level objectives included in the at least one service level objectives.

4. The method according to claim 1, wherein the sub-service level objectives include security measures, data recovery, data storage, and data indexing.

5. The method according to claim 1, further comprising assigning a priority number to the service level objective.

6. The method according to claim 1, wherein the sub-service level objectives comprise one or more of retention, backup, corporate compliance, ownership, indexing, access control, or encryption.

7. In a network where an owner has multiple files, a method for providing services to the files, the method comprising:

an information management server classifying files of an owner using at least information discovered and generated for the files and by applying a first set of rules to the files in order to assign one or more categories to each of the files individually; the information management server individually associating each of the files to sub-service level objectives included in a hierarchical service level mapping scheme, wherein;

each file is associated with at least one sub-service level objective by mapping each file to the at least one sub-service level objective based on the at least one category of each file, and wherein the sub-service level objectives include service areas that are performed on the files and service levels that define an extent to which the service areas are provided to the files;

the information management server combining the sub-service level objectives into service level objectives by applying a second set of rules to the sub-service level objectives, wherein each service level objective includes a different combination of the sub-service level objectives, and wherein the service level objectives identify one or more services that are performed on the files individually;

wherein the hierarchically service level mapping scheme enable service level needs of each file to be determined independently and to be customized for each file;

selecting service packages for the files based on the service level objectives;

associating the service packages with the files; and performing services identified in the service packages on the files individually, wherein at least one of the service level objective is configured such that services included in the at least one service level objective can be provided without specifying parameters for each of the services included in the at least one service level objective.

8. The method of claim 7, further comprising orchestrating services included in the service packages.

9. The method of claim 7, wherein combining the sub-service level objectives into service level objectives further comprise aggregating the sub-service level objectives into the service level objectives according to a series of rules and priorities, wherein the rules and priorities account for conflicting service level objectives.

10. The method of claim 7, wherein the sub-service level objectives comprise one or more of retention, backup, corporate compliance, ownership, indexing, access control, or encryption.

11. The method of claim 7, further comprising requesting the sub-service level objectives for the files without specifying parameters for each service associated with the sub-service level objectives.

12. The method of claim 7, wherein combining the sub-service level objectives into service level objectives further comprises prioritizing the sub-service level objectives to resolve conflicts for any file as the service level objectives are formed.

13. The method according to claim 9, wherein the series of rules and priorities may be user-defined or defined by the default settings or constraints of the network.

14. The method of claim 7, further comprising matching the service level objectives with a service package.

15. The method of claim 7, wherein combining the sub-service level objectives into service level objectives further comprises resolving conflicts for files assigned to more than one sub-service level objective.

16. The method of claim 7, wherein each service level objective is a grouping of selected sub-service level objectives.

17. The method of claim 1, further comprising using one or more adapters to discover and classify one or more components, in the computer system, wherein the one or more components are capable of providing one or more of the services to the files.

18. The method of claim 7, further comprising using one or more adapters to discover and classify one or more components, in the computer system, wherein the one or more components are capable of providing one or more of the services to the files.

* * * * *